(No Model.)
E. B. KOOPMAN.
BELT ATTACHMENT.
No. 544,856. Patented Aug. 20, 1895.
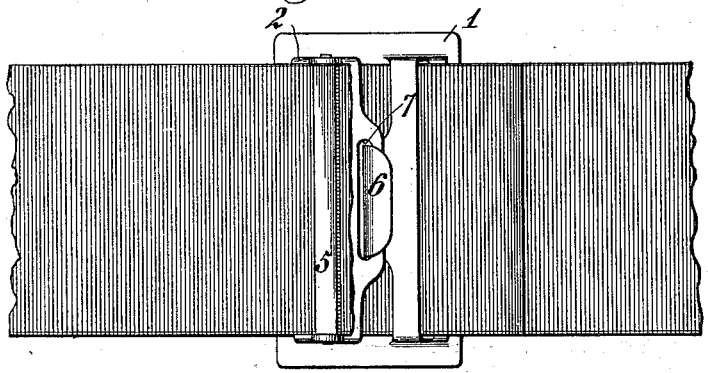
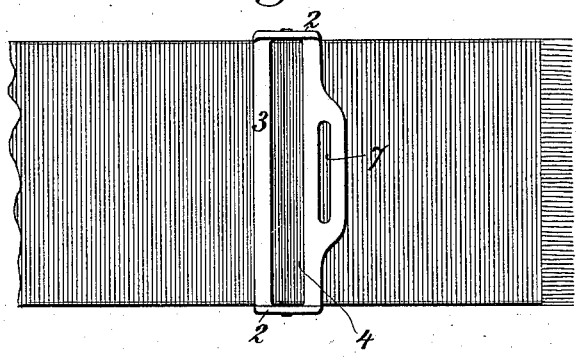
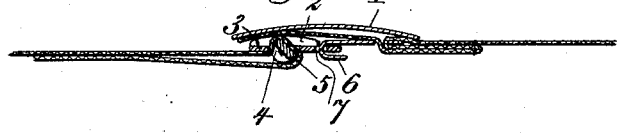
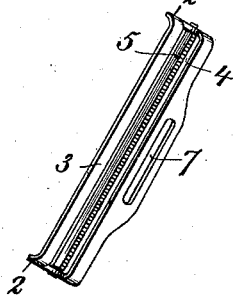
Witnesses:-
O. K. Hayford
L. M. Marble
Inventor:
Elias B. Koopman
By E. M. Marbleedom
His Attorneys.

UNITED STATES PATENT OFFICE.

ELIAS B. KOOPMAN, OF BROOKLYN, NEW YORK.

BELT ATTACHMENT.

SPECIFICATION forming part of Letters Patent No. 544,856, dated August 20, 1895.

Application filed April 17, 1895. Serial No. 546,010. (No model.)

*To all whom it may concern:*

Be it known that I, ELIAS B. KOOPMAN, a citizen of the United States, residing at Brooklyn, in the county of Kings and State of New York, have invented certain new and useful Improvements in Belt Attachments; and I do hereby declare the following to be a full, clear, and exact description of the invention, such as will enable others skilled in the art to which it appertains to make and use the same.

My invention relates to attachments for belts or other similar bands, and particularly to adjustable slides or end pieces for belts; and my invention consists in the novel means provided of holding the belt within this slide or end piece, in the novel construction of the end piece, and in the novel forms, construction, and arrangement of the parts thereof.

Belt-clasps usually consist of two metal pieces, mounted upon or secured to opposite ends of the belt and arranged to be fastened together by a hook or other suitable means. One of these metal pieces or attachments is usually a belt-plate, usually sewed or otherwise attached permanently to the belt. This belt-plate or belt attachment is usually provided with a hook adapted to engage with an eye or slot in the attachment upon the other end of the belt. This second belt attachment is usually loose upon the belt to permit of adjustment of the length of the belt, and consists of a metal plate, slotted to permit the belt to pass therethrough. It may properly be termed the "end piece" of the belt. The end of the belt, after passing through the slot in this end piece, is usually attached to a slide mounted upon and free to slide along the belt, and by moving which back and forth the length of the belt is adjusted. In order that the slide may remain in place when once adjusted, and so keep the length of the belt constant, it is necessary that the belt-ribbon be sufficiently long so that it may be doubled backward for a considerable distance, the slide occupying a position well around the side of the wearer. It will be seen, therefore, that with the ordinary belt-clasp a belt-ribbon must be used which is considerably longer than is necessary or desirable, and there is considerable waste of material.

By my invention I combine the end piece and slide in one by providing an end piece arranged to grasp the ribbon and prevent it from slipping.

The objects of my invention are, first, to provide an end piece for belts arranged to grasp the belt-ribbon without injuring the same; second, to provide an end piece which, while arranged to grasp the belt, may be readily adjustable thereon; third, to provide an end piece through which the belt may be passed easily and readily, and which shall be so constructed that it is immaterial which side of this end piece may be outermost, thereby avoiding danger of putting the end piece upon the belt wrongly, and, fourth, to make this end piece strong, simple, compact, and easy of use with any of the ordinary belt-plates.

These objects are attained in the invention herein described, and illustrated in the drawings which accompany and form a part of this application, in which the same reference-numerals indicate the same or corresponding parts, and in which—

Figure 1 is a rear view of a portion of the belt, showing upon one end thereof an ordinary belt-plate and upon the other end an end piece engaging with said belt-plate and constructed in accordance with my invention. Fig. 2 shows the end of a belt with my end piece thereon. Fig. 3 is a sectional view of a belt-plate and end piece, showing the method of passing the fabric through the end piece. Fig. 4 is a detail perspective view of the end piece.

In the drawings, 1 is an ordinary belt-plate, which may be attached to the belt in any suitable and common manner.

2 is the end piece, consisting of a guard-plate 3, provided with a longitudinal slot 4, in which is pivoted a tongue 5, the ends of the guard-plate being upturned slightly and provided with apertures which form bearings for the end of the tongue. This tongue is placed in the center of the slot 4 and is pivoted about its own central axis. It is slightly narrower than the slot 4, and therefore may be freely revolved therein. The edges of the tongue 5 are serrated, preferably, to afford a better grasp on the fabric.

The belt-plate is provided with the usual hook 6, adapted to engage with a corresponding slot 7 in the guard-plate. In placing my end piece upon the belt the end of the belt is passed through the slot 4 between the edges of the guard-plate and tongue 5, upon the side of the tongue farthest from the slot 7, and is passed through the slot 4 from that side of the end piece which is to be the inner side. Which side of the end piece is selected for the inner side is immaterial, as will be seen. The end of the belt is then passed over the tongue through the slot 4 between the edge of the guard-plate and the tongue 5, and this time on the side of the tongue nearest the slot 7. The end of the belt is folded back parallel with the main portion of the belt, this loose end being inside when the belt is worn. When the belt is passed through the end piece in this manner and is drawn tight, the strain upon the belt tends to turn the tongue 5 as nearly as possible parallel with the guard-plate 3, so that the fabric of the belt is pressed between the edge of the guard-plate and the edge of the tongue upon both sides of the tongue. This pressure is sufficient, so that the belt is held very firmly within the end piece. When the belt is loose it is easy to adjust the position of the end piece, and therefore the length of the belt, by simply sliding the end piece along the belt, which may be done without difficulty if the tongue be prevented from pressing the fabric too firmly against the guard-plate by holding the same at nearly right angles with the guard-plate with the finger. As soon as strain comes upon the belt, however, the tongue is caused to press the fabric against the edge of the guard-plate, and holds the same so firmly that it is impossible for the end piece to slip. It will be observed that with this end piece no separate slide attached to the end of the belt and sliding on the belt is necessary, nor is it necessary that the end of the belt shall be folded backward for a considerable distance, as is the case with the belt-clasps ordinarily used, a margin of an inch or less beyond the end piece being amply sufficient to prevent the end piece from slipping. When it is desired to use a slide upon the belt, however, for holding the end of the belt-ribbon, the belt attachment herein described may be used for that purpose, the slot 7 being long enough to receive the end of the ribbon. When my belt attachment is so used, the end piece will ordinarily be a simple loop. The fact that the tongue 5 is pivoted at its central axis in the center of the slot 4, and that this tongue may be revolved completely around within said slot, makes it possible to have either side of the guard-plate turned outward. It likewise greatly facilitates the threading of the end of the belt through the slot 4 around this tongue.

Having thus completely described my invention, what I claim, and desire to secure by Letters Patent, is—

1. The herein described belt attachment, consisting of a guard plate slotted longitudinally, and a tongue pivoted in said slot, said guard plate and tongue being arranged to permit the ribbon to pass through said slot and between the edges of said guard plate and tongue, on both sides of said tongue, substantially as described.

2. The herein described end piece of a belt clasp, consisting of a guard plate slotted longitudinally, and a tongue pivoted in such slot, said guard plate and tongue being arranged to permit the ribbon to pass through said slot and between the edges of said guard plate and tongue on both sides of said tongue, and said guard plate being provided with means for attaching the same to the other end of the belt, substantially as described.

3. The herein described end piece of a belt clasp, consisting of a guard plate slotted longitudinally, and having a tongue pivoted through its central axis in the center of said slot, and revoluble therein, said guard plate being provided with means for attaching the same to the other end of the belt, substantially as described.

4. The herein described end piece of a belt clasp, consisting of a guard plate slotted longitudinally, and a tongue having roughened or serrated edges, and pivoted by its central axis in the center of said slot, said guard plate being provided with means for attaching the same to the other end of the belt, substantially as described.

In testimony whereof I affix my signature in presence of two witnesses.

ELIAS B. KOOPMAN.

Witnesses:
 HARRY M. MARBLE,
 JANDINE LYNG.